US008786707B1

(12) United States Patent
Ettinger

(10) Patent No.: US 8,786,707 B1
(45) Date of Patent: Jul. 22, 2014

(54) PATTERN-FREE CAMERA CALIBRATION FOR MOBILE DEVICES WITH ACCELEROMETERS

(75) Inventor: Scott Ettinger, San Carlos, CA (US)

(73) Assignee: Google Inc., Mountain View, CA (US)

( * ) Notice: Subject to any disclaimer, the term of this patent is extended or adjusted under 35 U.S.C. 154(b) by 41 days.

(21) Appl. No.: 13/423,918

(22) Filed: Mar. 19, 2012

(51) Int. Cl.
*H04N 17/00* (2006.01)
*H04N 17/02* (2006.01)
*H04N 5/228* (2006.01)

(52) U.S. Cl.
USPC ............. 348/180; 348/208.2; 348/208.4; 348/208.12

(58) Field of Classification Search
CPC ........... H04N 17/002; H04N 5/23248; H04N 5/23251; H04N 5/23254; H04N 5/23264
USPC ......... 348/208.99, 208.2, 208.4, 208.12, 180, 348/182, 187, 188
See application file for complete search history.

(56) References Cited

U.S. PATENT DOCUMENTS

| | | | |
|---|---|---|---|
| 7,925,144 B2 | 4/2011 | Washisu | |
| 8,059,154 B1 * | 11/2011 | Kiro et al. | 348/184 |
| 8,106,968 B1 * | 1/2012 | Rudin et al. | 348/241 |
| 2002/0122117 A1 * | 9/2002 | Nakagawa et al. | 348/218 |
| 2003/0038933 A1 * | 2/2003 | Shirley et al. | 356/243.1 |
| 2003/0222984 A1 * | 12/2003 | Zhang | 348/187 |
| 2004/0085440 A1 * | 5/2004 | Fennell et al. | 348/42 |
| 2008/0317313 A1 * | 12/2008 | Goddard et al. | 382/131 |
| 2009/0021580 A1 * | 1/2009 | Ishigami et al. | 348/142 |
| 2009/0103910 A1 * | 4/2009 | Li et al. | 396/55 |
| 2009/0198354 A1 | 8/2009 | Wilson | |
| 2010/0111370 A1 | 5/2010 | Black et al. | |
| 2010/0245593 A1 * | 9/2010 | Kim et al. | 348/188 |
| 2010/0259594 A1 | 10/2010 | Johansson et al. | |
| 2011/0090337 A1 * | 4/2011 | Klomp et al. | 348/144 |
| 2011/0169917 A1 * | 7/2011 | Stephen et al. | 348/46 |
| 2011/0228112 A1 * | 9/2011 | Kaheel et al. | 348/208.4 |

OTHER PUBLICATIONS

Fischler, M.A., and R.C. Bolles, "Random Sample Consensus: A Paradigm for Model Fitting with Applications to Image Analysis and Automated Cartography," *Communications of the ACM*, 24(6):381-395 (Jun. 1981).
Szeliski, R., "Image Alignment and Stitching: A Tutorial," *Foundations and Trends in Computer Graphics and Vision* 2(1):1-04, R. Szeliski, United States (2006).

* cited by examiner

*Primary Examiner* — Nhan T Tran
*Assistant Examiner* — Xi Wang
(74) *Attorney, Agent, or Firm* — Lerner, David, Littenberg, Krumholz & Mentlik, LLP

(57) ABSTRACT

A method for generating values for one or more camera calibration parameters is described. The camera calibration parameters may include focal length, lens distortion, and optical center of the lens. A plurality of photographs are captured from a camera on a device which includes an accelerometer. Common features are determined between the captured photographs. Accelerometer data is analyzed for each captured photograph. The values for the camera calibration parameters are generated based on the common features and the accelerometer data and stored for future use with various applications.

20 Claims, 7 Drawing Sheets

PATTERN-FREE CAMERA CALIBRATION FOR MOBILE DEVICES WITH ACCELEROMETERS

BACKGROUND

Some mobile software applications require a set of camera intrinsic parameters or calibration parameters describing the optical characteristics of the camera lens and sensor system. Determining such calibration parameters typically involves labor intensive calibration methods directed to taking a number of photos of a printed grid pattern. The photos of a printed grid pattern are taken at various vantage points and the image data from each photo is analyzed to determine the calibration parameters. It is often difficult for a user to properly capture a photo of a grid pattern. Correctly aligning and focusing on the grid pattern create problems for obtaining camera calibration parameters. This is even more problematic when using a mobile device, as the user may not have access to a grid pattern or may not be experienced in the proper use of a grid pattern.

BRIEF SUMMARY

In an embodiment, a mobile device system includes a camera, an accelerometer, and a processor. The camera has one or more calibration parameters. The processor is configured to determine a set of common features between a plurality of photographic images taken by the camera, the features including at least a portion of a same object captured in each of the photographic images. The processor is further configured to analyze acceleration data provided by the accelerometer, wherein the acceleration data is analyzed for each of the captured photographic images. The processor is further configured to generate, based on the set of common features and the acceleration data, values for the one or more calibration parameters.

More generally, a method performed by a computing device for determining one or more calibration parameters of a camera is described. A set of common features between a plurality of photographic images taken by the camera is identified. The features include at least a portion of a same object captured in each of the photographic images. Data provided by an accelerometer coupled to the camera is analyzed for each of the captured photographic images. Values for the one or more calibration parameters associated with the camera are generated based on at least the set of common features and the acceleration data.

In an embodiment, a networked computer system includes a communication interface and a processor. The communication interface is configured to receive a set of common features between a plurality of photographic images taken by a camera, the features including at least a portion of a same object captured in each of the photographic images. The communication interface is further configured to receive acceleration data provided by an accelerometer coupled to the camera. The processor is configured to generate, based on the set of common features and the acceleration data, values for one or more calibration parameters associated with the camera.

Further features and advantages, as well as the structure and operation of various embodiments are described in detail below with reference to the accompanying drawings.

BRIEF DESCRIPTION OF THE DRAWINGS/FIGURES

The accompanying drawings are incorporated herein and form a part of the specification to provide illustrative embodiments of the claimed subject matter.

Figure 1:
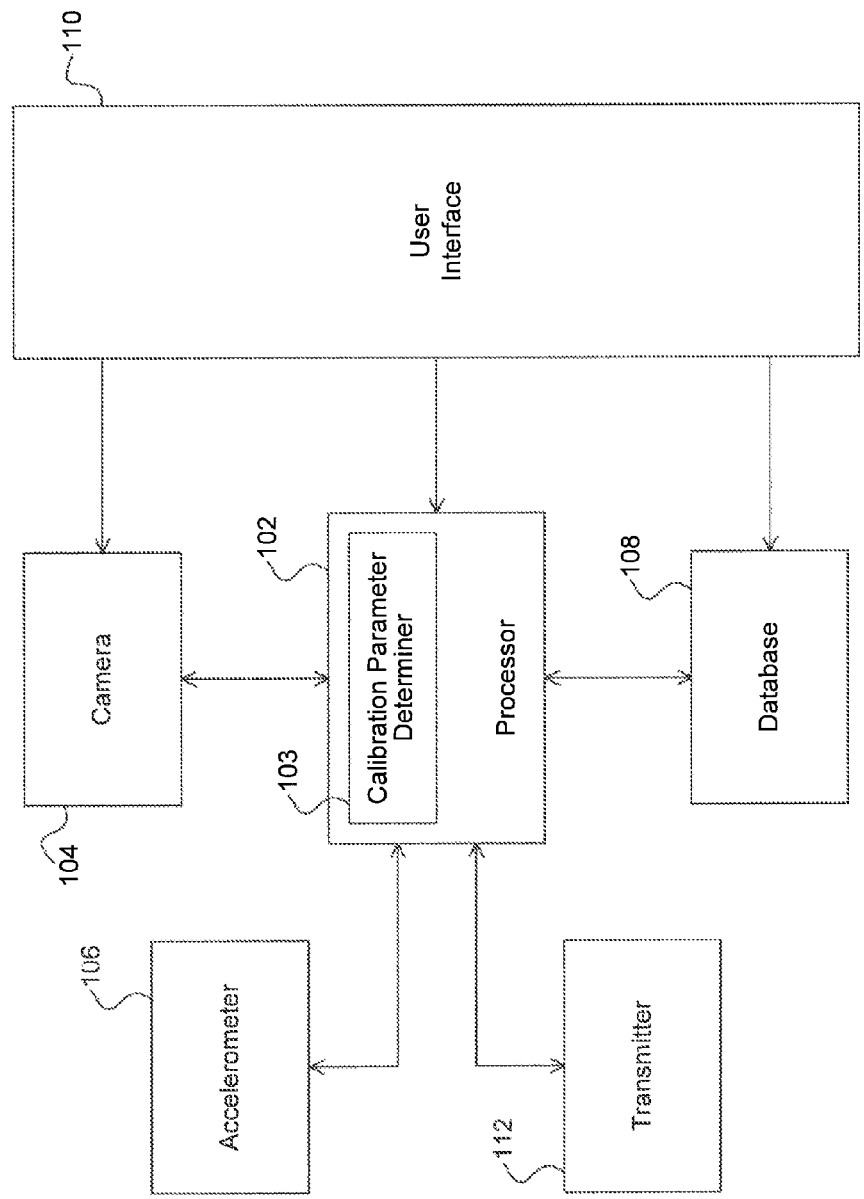
FIG. 1 is a diagram illustrating the components of a mobile device, according to an embodiment.

Embodiments will be described with reference to the accompanying drawings.

DETAILED DESCRIPTION OF EMBODIMENTS

Overview of Embodiments

In an embodiment, calibration parameters of a camera associated with a mobile device are determined by combining the analysis of captured images with accelerometer output. Examples of calibration parameters include, but are not limited to, a focal length, camera center, radial distortion, and tangential distortion. It is often the case that such calibration parameters are inherent to a specific type of camera or lens system coupled with a mobile device. Various camera-related applications use these parameters to perform their specific functions. As an example, panorama stitching of captured images may require the values for the camera's calibration parameters in order to accurately merge the images together.

In one example, calibration parameters are determined automatically from images taken by a user with a mobile device having a camera and an accelerometer. In the example, a set of images are taken while tilting the camera around an axis either passing through the center of the camera lens and parallel to the ground, or an axis passing lengthwise across the center of the camera lens and parallel to the ground. The tilt angles may be referred to as the roll angle and the pitch angle respectively. Each captured image is also associated with an acceleration reading provided by an accelerometer. In one example, the accelerometer measures a gravity vector relative to the mobile device. A set of common features may be identified among the captured images. These identified features include at least a portion of a same object captured in each image. In another example, the identified features include at least a portion of more than one object captured in each image. In one example, the calibration parameters are determined by taking substantially fewer pictures than methods currently offered. In another example, the calibration parameters are determined without the need for a printed grid pattern.

In an embodiment, a calibration parameter determiner generates a set of camera calibration parameters from the analysis of the captured images coupled with the data provided by the accelerometer. The calibration parameter determiner may be software stored in memory, and implemented on one or more processing devices. In another embodiment, the calibration parameter determiner may be implemented in hardware. In one example, the set of camera calibration parameters are determined by the calibration parameter determiner present on the mobile device. In another example, the set of camera calibration parameters are determined on a remote computing device. In one embodiment, the calibration parameter determiner provides calibration parameters that minimize a given error function.

It should be appreciated that alternative algorithms may also be employed for determining calibration camera parameters which utilize both image data and acceleration data. According to an embodiment, the determination of calibration camera parameters involves minimizing the total projection error given the set of common features and the accelerometer data. Additionally, various minimization techniques may be employed for determining best-fit calibration parameters, such as, for example, Levenberg-Marquardt minimization or a conjugate gradient descent. In another example, any nonlinear least squares optimization technique may be used for determining best-fit calibration parameters. Any or all of the measured or calculated data may be stored in a database or transmitted to a remote computing device either for further computation or storage.

FIG. 1 illustrates a diagram of components within a mobile device according to an embodiment. The mobile device may be any device capable of taking images and coupled to an accelerometer. For example, the mobile device may be a smartphone, tablet, laptop, digital camera, etc. Examples of components coupled to the mobile device include a processor 102, calibration parameter determiner 103, a camera 104, an accelerometer 106, a database 108, a user interface 110, and a transmitter 112.

Processor 102 can be a processor, such as, but not limited to, a microprocessor, field programmable gate array (FPGA), or digital signal processor (DSP). In an embodiment, calibration parameter determiner 103 is executed by processor 102. Calibration parameter determiner 103 is configured to determine camera calibration parameters based on analysis of images captured with camera 104 and data collected from accelerometer 106, according to an embodiment.

Camera 104 may include one or more optical components for capturing an image. The optical components may include, but are not limited to, a focusing lens, a shutter, a digital photodetector array, and/or an eyepiece. Camera 104 may be incorporated into the structure of the mobile device, for example, camera 104 may be a smartphone camera or a camera built into the cover of a laptop. In another example, camera 104 may be communicatively coupled to the mobile device via wireless transmission or a wired connection.

Accelerometer 106 may be any design of accelerometer as would be understood by one skilled in the art given the description herein. Accelerometer 106 may include a 3-axis accelerometer or one or more single-axis accelerometers. Data collected from accelerometer 106 is accessed by processor 102 in determining the camera calibration parameters. In an embodiment, accelerometer 106 contains a gyroscope and the data contains data measured from the gyroscope.

Database 108 may be used to store any of the collected or calculated data. For example, database 108 may store data provided by accelerometer 106 or image data captured from camera 104. Additionally, database 108 may store the calculated camera calibration parameters. Database 108 may be any known storage medium to those of skill in the art given the description herein including, but not limited to, random access memory (RAM), flash memory, hard disk drive, etc.

User interface 110 may provide output to be interpreted by a user, or prompt for user input during the process. User interface 110 may include various components recognized by one having skill in the art given the description herein, such as digital displays, keyboards, touchscreens, keypads, voice activation, etc. User interface 110 allows for control over a set of actions performed by camera 104 or processor 102.

In an example, calibration parameter determiner 103 is a software program, such as, an application that can be executed by processor 102 to perform operations. Calibration parameter determiner 103 may be implemented in software, firmware, hardware, or any combination thereof. A user may execute calibration parameter determiner 103 via a user interface 110 wherein calibration parameter determiner 103 initiates a calibration sequence for determining the camera calibration parameters. During the calibration sequence, the user may be prompted to take one or more pictures using camera 104. In another example, the user may receive feedback regarding the accuracy of the calculated camera calibration parameters. If the captured images cannot be used to determine the camera calibration parameters due to one or more abnormalities in the captured images, user interface 110 may prompt the user to retake the pictures. Examples of abnormalities that could adversely affect the determination of camera calibration parameters are explained in more detail later. In another example, user interface 110 allows a user to access data stored in database 108.

Transmitter 112 may include any components recognized by those having skill in the art given the description herein for the purpose of transmitting and/or modulating data including, but not limited to, antennas, analog to digital converters, digital to analog converters, low pass filters, band pass filters, oscillators, multiplexers, demultiplexers, etc. Furthermore, transmitter 112 may include one or more interfaces to access wired or wireless networks such as Ethernet network and Wi-Fi networks, and/or one or more interfaces such as USB and Bluetooth to couple proximately located devices.

Further description regarding rotational image collection at different pitch angles and/or roll angles is provided below with respect to FIGS. 2-3. Further description of techniques for determining calibration parameters is also discussed with respect to FIGS. 4-5. Remote networking embodiments and computer system embodiments are also described with respect to FIGS. 6-7.

Rotational Image Collection

Figure 2:
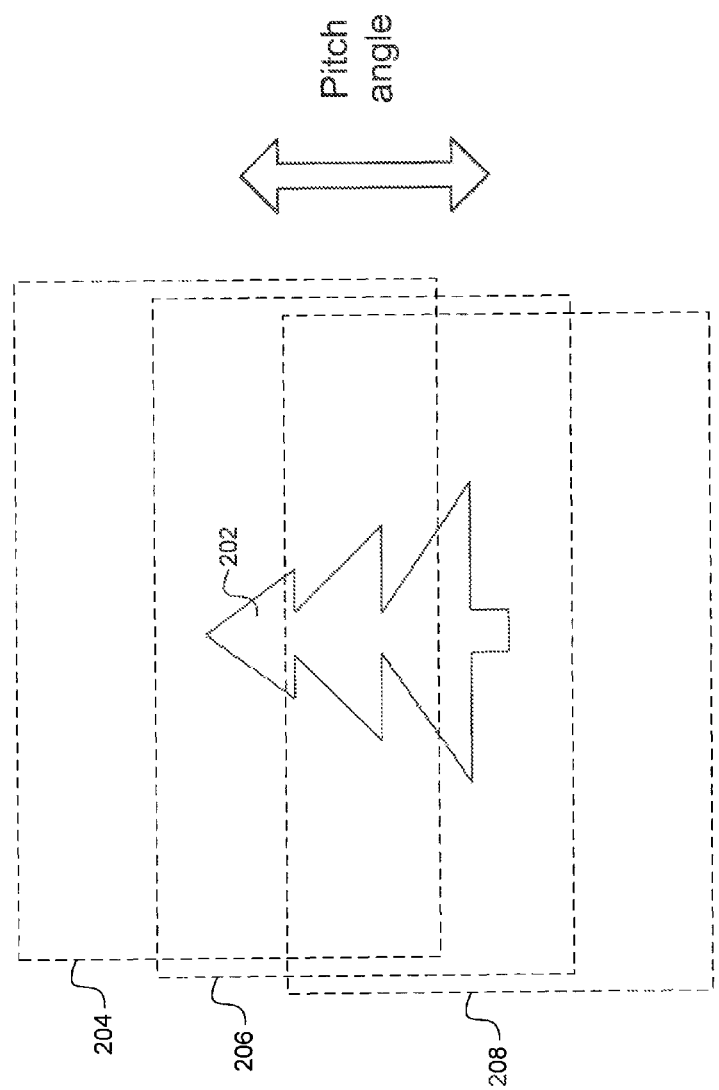
FIG. 2 illustrates images taken of an object at varying pitch angle, according to an embodiment.

FIG. 2 illustrates an image scene 200, where pictures of an object 202 are captured at varying pitch angle across a series of images. In an example, three images are captured of object 202 while the pitch angle is varied between them. The pitch angle is the angle associated with a rotation of the camera about an axis passing across the width of the lens and parallel to the ground. The three images may be captured in the following order: a first image 204 is captured followed by an adjustment of the pitch angle by rotating the camera downwards; a second image 206 is captured followed by another adjustment of the pitch angle by rotating the camera downwards; a third image 208 is captured. It should be understood that any number of images may be captured at varying pitch angles. The above example describes one possible implementation of the method and is not intended to be limiting.

In an embodiment, at least a portion of object 202 is common among each picture taken. The portion may be any size or any particular feature of object 202 such as an edge, corner, coloration pattern, etc. In the example illustrated, the center portion of object 202 is common to each of the three pictures taken.

Ideally, a purely rotational movement of the camera is desired to provide accurate associations between the movement of the object between images and the accelerometer readings. However, it may be difficult to reduce contributions of any other type of movement, especially when using a handheld camera device. The parallax error may be reduced by taking the images at least a certain distance away from object 202. In an example, images are captured from at least 50 feet away from object 202. It should be understood that images may still be taken at any distance, including at a distance under 50 feet, however, the closer the camera is to the object, the higher the error contribution may be due to parallax.

Figure 3:
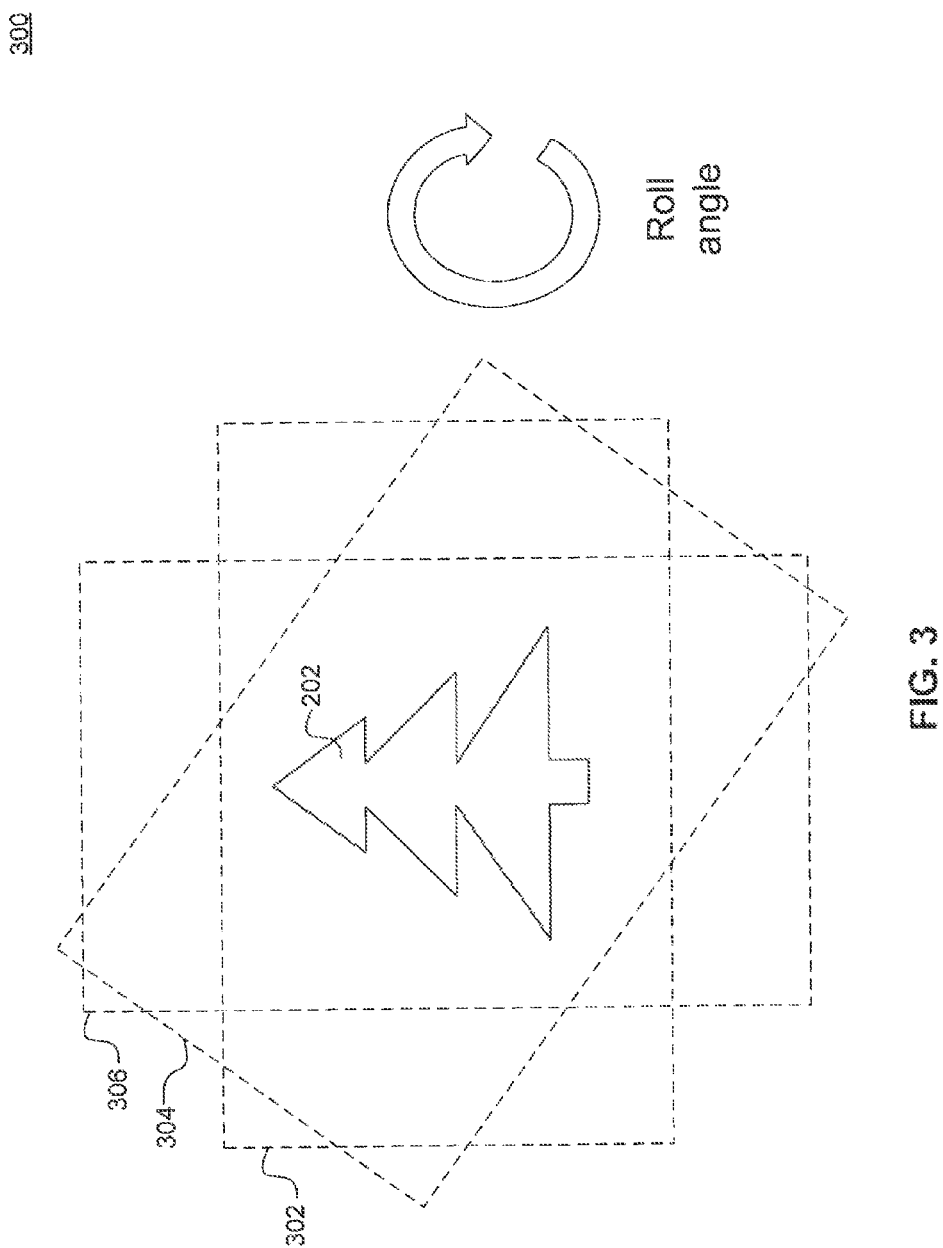
FIG. 3 illustrates images taken of an object at varying roll angle, according to an embodiment.

FIG. 3 illustrates an image scene 300 according to another embodiment. Pictures of object 202 are captured at varying roll angle across a series of images. The roll angle is the angle associated with a rotation of the camera about an axis passing through the center of the lens (the optical axis) and parallel to the ground. The three images may be captured in the following order: a first image 302 is captured followed by an adjustment of the roll angle by rotating the camera clockwise; a second image 304 is captured followed by another adjustment of the roll angle by rotating the camera further clockwise; a third image 306 is captured. It should be understood that any number of images may be captured at varying roll angles. The above example describes one possible implementation of the method and is not intended to be limiting. In the example, substantially all of object 202 is present in each of the three images captured. In another example, only a portion of object 202 is present in each image captured.

The error contribution due to parallax applies to the embodiment illustrated in scene 300 in the same manner already described for scene 200 above.

It should be understood that a series of captured images of an object may vary in both pitch angle and roll angle at the same time. The accelerometer data can still be used to track changes in the orientation of the camera even with both angles being varied.

Methods to Determine Calibration Parameters

Figure 4:
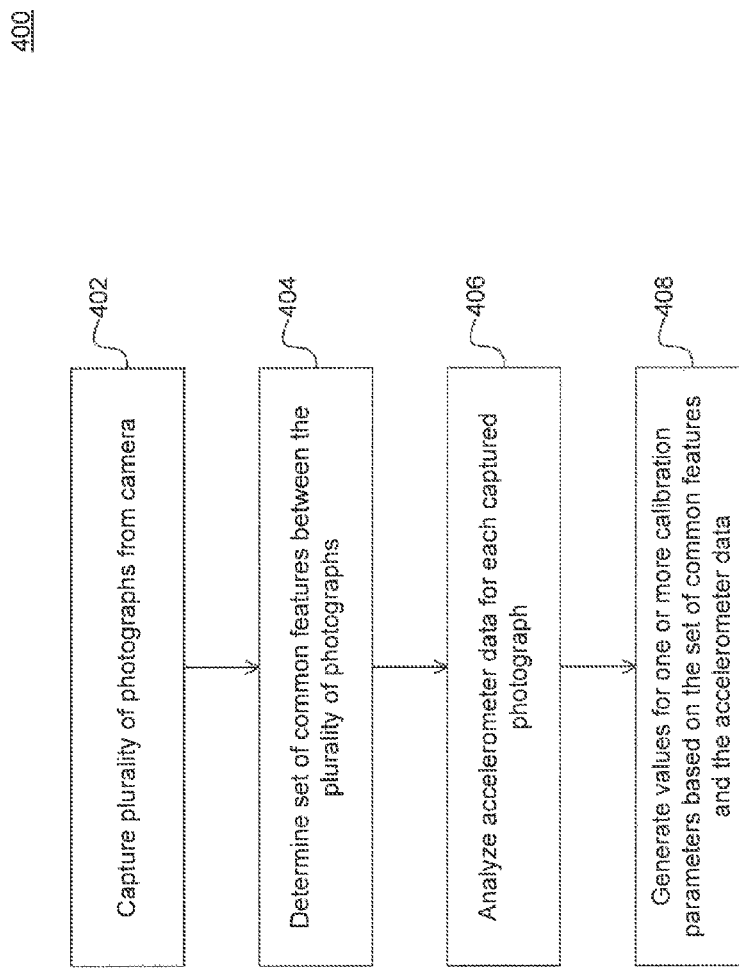
FIG. 4 is a method for generating values for one or more calibration parameters, according to an embodiment.

FIG. 4 illustrates an exemplary calibration method 400. Calibration method 400 may be performed to determine one or more camera calibration parameters. In an embodiment, calibration method 400 may be carried out by the system illustrated in FIG. 1. For example, the steps of calibration method 400 may be executed by calibration parameter determiner 103 on processor 102. However, it should be understood that calibration method 400 is not intended to be limited to being performed only by the system illustrated in FIG. 1. Calibration method 400 may be performed by any camera system coupled to an accelerometer.

At stage 402, a plurality of photographs are captured from a camera. At least one of a pitch angle and a roll angle is varied across the photographs taken. Examples of photographs taken of an object are illustrated in FIGS. 2-3.

At stage 404, a set of common features are determined between the plurality of photographs. The common features may include a particular shape, pattern, edge, etc., at least a portion of which appears in each photograph taken. In an embodiment, pairwise matches are made between the common features using an image descriptor method. Such methods may include extracting descriptors from interest points of the common features and match them by comparing descriptors. Various image descriptor methods are known to those skilled in the art given the description herein. Examples of image descriptor methods include SIFT, SURF, MOPS, BRIEF, etc. In an embodiment, a geometric constraint model is used to prune for incorrect matches made by the image descriptor. In on example, the geometric constraint model may be a rotational or homography model. In one example, the geometric constraint model is enacted using a RANSAC estimator algorithm. The RANSAC algorithm is described in more detail in Fischler et al., "Random Sample Consensus: A Paradigm for Model Fitting with Applications to Image Analysis and Automated Cartography," Communications of the ACM, Issue 6, Vol. 24, pp. 381-395, 1981, which is herein incorporated by reference in its entirety.

The geometric solution is under-constrained as the camera calibration parameters (in particular the focal Length) are needed to compute the camera motion from the identified common features (however point matches can be accurately determined). Conversely, the camera motion is needed to compute the camera parameters from the point correspondences. In an embodiment, constraining the problem to the correct solution includes integrating the pitch and/or roll angles measured by an accelerometer coupled to the camera with the geometric solution.

At stage 406, accelerometer data is analyzed from each captured photograph. The accelerometer is coupled to the camera in order to determine an orientation of the camera at any given point in time. The accelerometer data is used to determine the pitch and/or roll angle for each captured image.

The accelerometer is capable of measuring changes in the pitch and/or roll angle since the acceleration due to gravity is constant and always in a direction substantially perpendicular to the ground. Thus, the orientation of the camera can be determined by comparing the accelerometer output in reference to the acceleration vector associated with gravity. In one example, accelerometer output from a single axis is used to determine the orientation. In another example, accelerometer output from more than one axis is used to determine the orientation.

In an embodiment, the accelerometer data is filtered to reduce noise. The filtering may be performed in hardware, software or a combination thereof. In one example, the camera is held still on the order of one second before taking a photograph to allow the filter to settle.

At stage 408, one or more of the camera calibration parameters are generated based on the set of common features and the accelerometer data. Thus, at least one of a focal length, camera center, radial distortion or tangential distortion is determined for the camera. In one example, an error function given the pairwise matches calculated in stage 404, the camera orientation calculated in stage 406, and the calibration parameters is minimized over the range of calibration parameters to determine an optimal set of calibration parameters. The optimization may be illustrated by equation 1 below:

$$\arg\min_c(\text{erf}(P(i,j),\theta,C)) \quad (1)$$

In equation 1, C represents the set of camera parameters to be determined, P represents the function of pairwise matches, and θ represents the pitch and/or roll angle. The arg min function determines the set of camera parameters, C, for which the error function (erf) attains a minimum value. In one example, the error function can be implemented as the sum of the squared angle differences between the projected rays of all point matches in the images given the camera parameters and the pitch and/or roll angles.

In an embodiment, a nonlinear numerical optimization method may be employed to solve for the set of calibration parameters that minimize the error function. In one example, a Levenberg-Marquardt minimization technique is used to solve the minimization. In another example, a conjugate gradient descent technique is used to solve the minimization. In another example, any nonlinear least squares optimization technique may be used solve the minimization. The application of such techniques would be known to one having skill in the art given the description herein.

Although not explicitly shown in calibration method 400, the calibration parameters may be stored in one or more databases after being determined at stage 408. Also, the calibration parameters may be accessed by one or more software programs or hardware protocols either coupled to the camera or remotely located.

Figure 5:
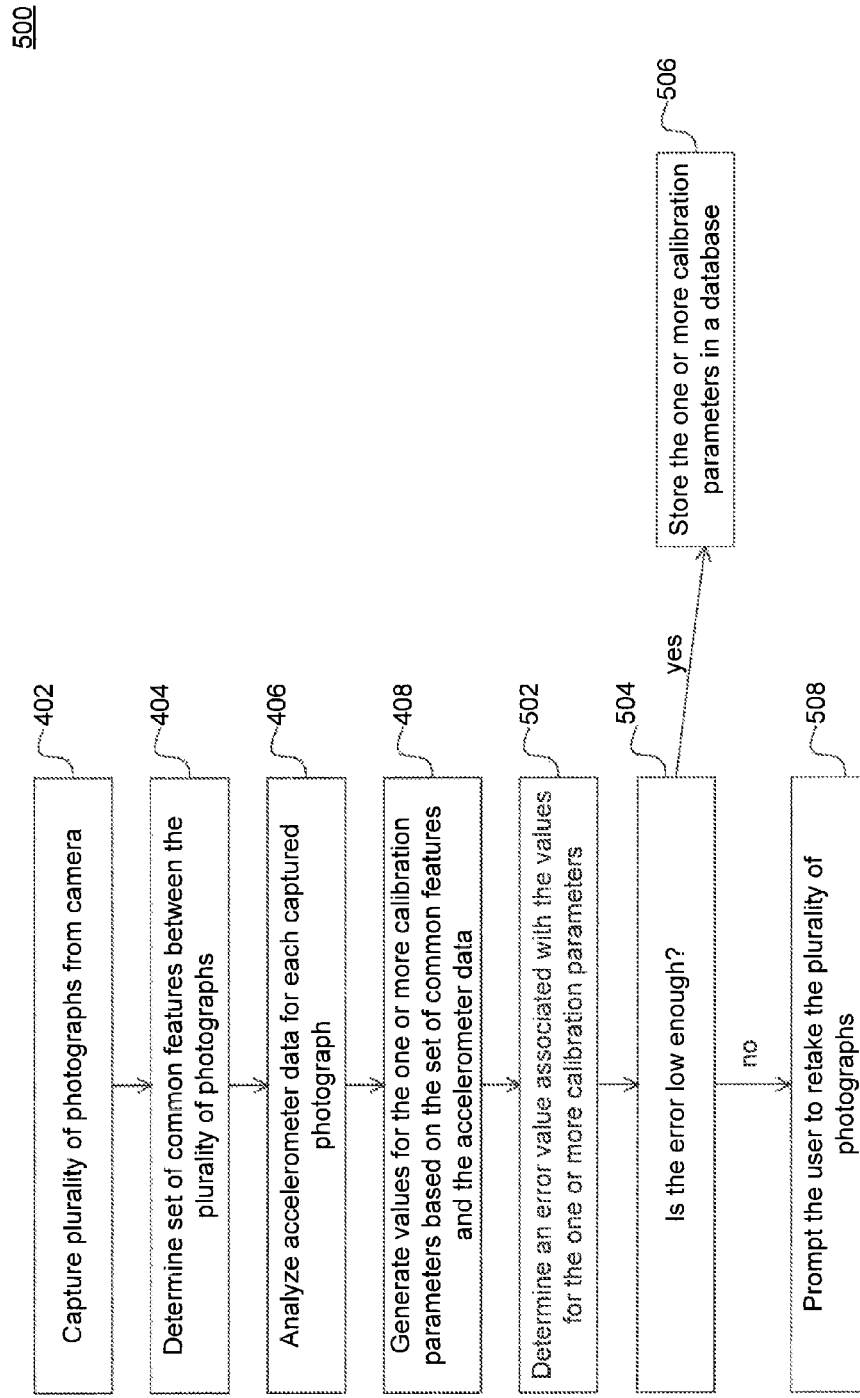
FIG. 5 is a method for generating values for one or more calibration parameters, according to another embodiment.

FIG. 5 illustrates an example of a second calibration method 500. Calibration method 500 contains the same first steps as calibration method 400 for determining the one or more calibration parameters. Calibration method 500 further contains steps comparing an error value associated with the calibration parameters to a threshold to determine, for example, if the photographs should be retaken. In an embodiment, calibration method 500 may be carried out by the system illustrated in FIG. 1. For example, the steps of calibration method 500 may be executed by calibration parameter determiner 103 on processor 102. However, it should be understood that calibration method 500 is not intended to be limited to being performed only by the system illustrated in FIG. 1. Calibration method 500 may be performed by any camera system coupled to an accelerometer.

Stages 402-408 of calibration method 500 are considered to perform actions similar to the same-labeled stages of calibration method 400. At stage 502, an error value associated with calibration parameters is determined. The error value may be related to the value returned by the error function itself following the optimization procedure described in stage 408. In one example, the error value is a value between 0 and 1. Alternatively, the error value may be calculated from a different function and related to how closely the determined calibration parameters are believed to be correct.

For example, the error function returns a value between 0 and 1 when using positive variables. If the error function value given the set of variables provided, e.g., $P(i,j)$, $\theta$, $C$, is found to be 0.2, then the error=associated with the determined set of calibration parameters would be 0.2. Other factors may be considered as well when determining an error value without deviating from the scope or spirit of the invention.

At stage 504, the error value is compared to a threshold. For example, the threshold sets an acceptable error level. If the error value is found to be lower than the threshold, then the determined calibration parameters are considered to be accurate enough compared to their actual values. If the error value is found to be higher than the threshold, then the determined calibration parameters are considered to be inaccurate.

According to an embodiment, if the calibration parameters are found to be accurate, then the method proceeds from stage 504 to stage 506 where the calibration parameters are stored in one or more databases. Also, the calibration parameters may be accessed by one or more software programs or hardware protocols either coupled to the camera or remotely located.

If the calibration parameters are not found to be accurate, then the method proceeds from stage 504 to stage 508. At stage 508, the user may be prompted to retake the photographs. Afterwards, method 500 repeats starting back at stage 402, according to an embodiment.

Mobile Network Embodiment

Figure 6:
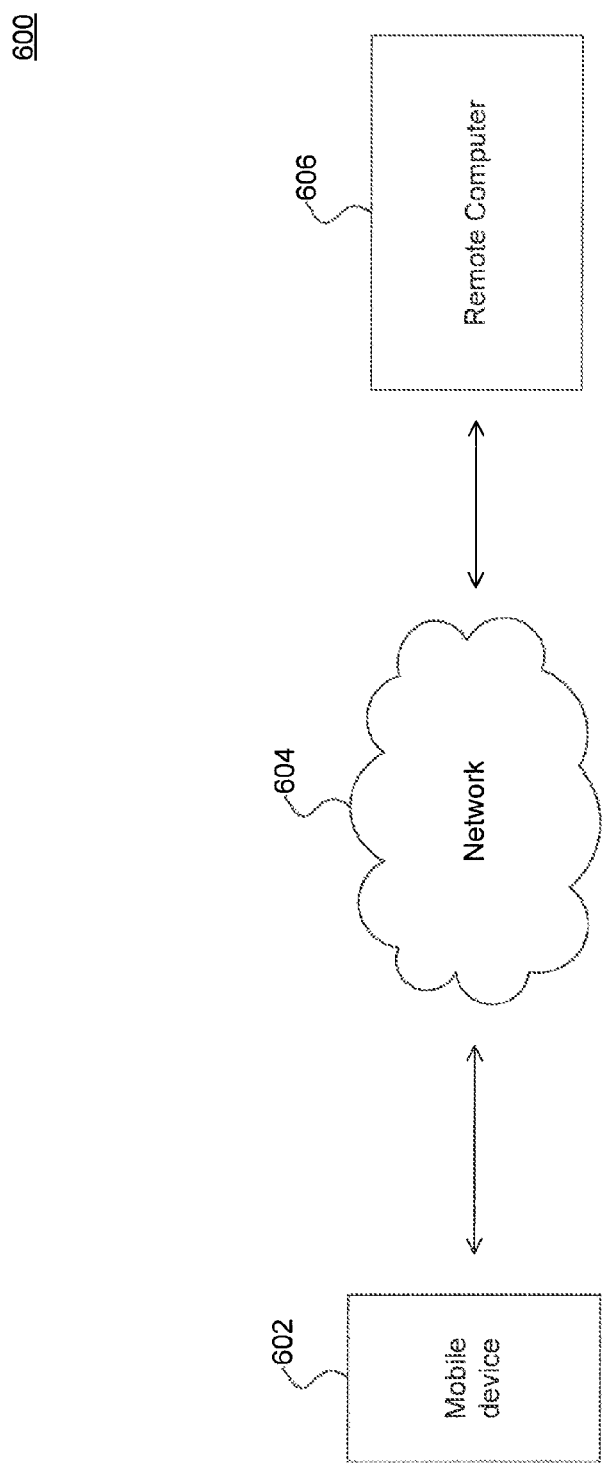
FIG. 6 is a diagram illustrating a network shared by a mobile device and a networked computer, according to an embodiment.

FIG. 6 illustrates a mobile network 600, according to an embodiment. Mobile network 600 may include a mobile device 602 which communicates with networked computer 606 via network 604. It should be understood that mobile network 600 may include any number of mobile devices in communication with networked computer 606. In an embodiment, signals passed between mobile device 602 and networked computer 606 via network 604 may be transmitted through any means, or combination thereof, known to a person skilled in the art given the description herein. Transmission means may include, but are not limited to, WiFi, Bluetooth, 3G, 4G, etc. Network 604 may include any network such as the Internet, a wide area network, wireless network, telephone network, or local area network. Furthermore, wireless transmission of any data associated with network 604 over long distances may be achieved by the data first being received by a closest one or more cell towers (not shown) for routing the data to networked computer 606. Networked computer 606 may include one or more standalone computers, a server, a server farm, or a cloud-computing server.

In an embodiment, data associated with captured images and accelerometer measurements may be transmitted from mobile device 602 via network 604 to remote computer 606. Once received, remote computer 606 may perform the determination of the calibration parameters using the methods described earlier. In one example, the calibration parameters are stored on one or more databases coupled to remote computer 606. In another example, the calibration parameters are transmitted back to mobile device 602 after being generated by remote computer 606.

In another embodiment, remote computer 606 stores a series of calibration parameters that have been previously determined for various camera models. In one example, the calibration parameters are provided by the manufacturer of the camera. In another example, the calibration parameters are stored from determinations made from a plurality of mobile devices sending their data to remote computer 606. Mobile device 602 may access the stored calibration parameters on remote computer 606 which pertain to the camera model associated with mobile device 602.

Example Computer System Implementation

Figure 7:
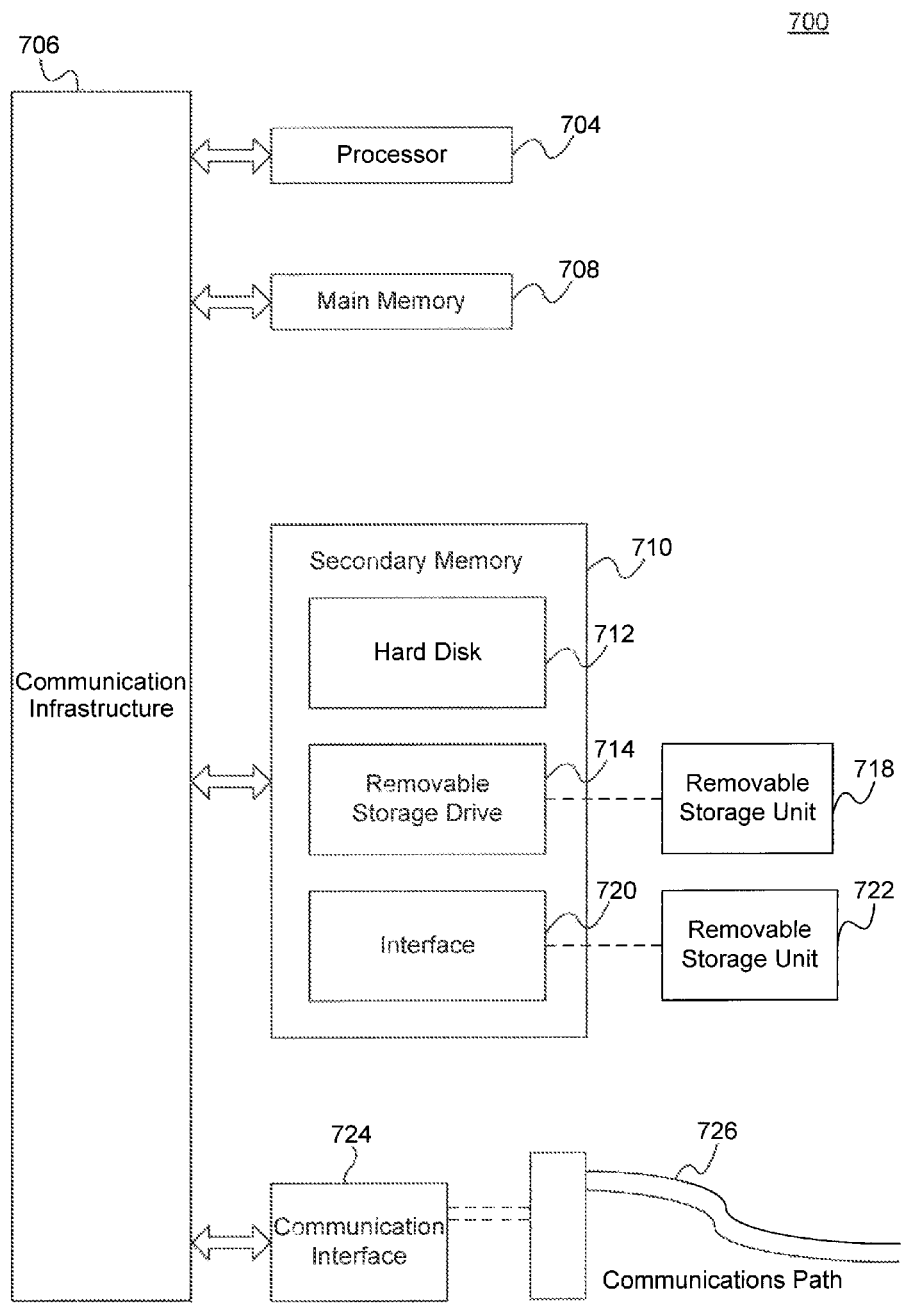
FIG. 7 is a diagram illustrating the architecture of a networked computer, according to an embodiment.

Various aspects of the present invention can be implemented by software, firmware, hardware, or a combination thereof. FIG. 7 illustrates an example computer system 700 in which the embodiments, or portions thereof, can be implemented as computer-readable code. Various embodiments of the invention are described in terms of this example computer system 700. For example, the actions described in stages 404 through 408 of calibration method 400 can be implemented in computer system 700. In another example, the further actions described in stages 502 through 508 may also be implemented in computer system 700.

Computer system 700 includes one or more processors, such as processor 704. Processor 704 can be a special purpose or a general purpose processor. Processor 704 is connected to a communication infrastructure 706 (for example, a bus or network).

Computer system 700 also includes a main memory 708, preferably random access memory (RAM), and may also include a secondary memory 710. Secondary memory 710 may include, for example, a hard disk drive 712 and/or a removable storage drive 714. Removable storage drive 714 may include a floppy disk drive, a magnetic tape drive, an optical disk drive, a flash memory, or the like. The removable storage drive 714 reads from and/or writes to removable storage unit 718 in a well-known manner. Removable storage unit 718 may include a floppy disk, magnetic tape, optical disk, etc. Removable storage unit 718 is read by and written to by removable storage drive 714. As will be appreciated by persons skilled in the relevant art(s), removable storage unit 718 includes a computer usable storage medium having stored therein computer software and/or data.

In alternative implementations, secondary memory 710 may include other means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720. Software and data are transferred via interface 720 from the removable storage unit 722 to communication infrastructure 706.

Computer system 700 also includes a network interface 724. Network interface 724 allows software and data to be transferred between computer system 700 and external devices. Network interface 724 may include a modem, an Ethernet interface (such as an Ethernet card), a communications port, a PCMCIA slot and card, or the like. Software and data transferred via network interface 724 are in the form of signals which may be electronic, electromagnetic, optical, or other signals capable of being received by network interface 724. These signals are provided to network interface 724 via a communications path 726. Communications path 726 carries signals and may be implemented using wire or cable, fiber optics, a phone line, a cellular phone link, an RF link or other communications channels. For example, communications path 726 may correspond to a communication network connected to the global Internet, and network interface 724 may be a network card configured to receive TCP/IP-based communications from such networks.

In this document, the term "computer readable storage medium" is used to generally refer to media such as removable storage unit 718, removable storage unit 722, and a hard disk installed in hard disk drive 712. Computer readable storage medium can also refer to one or more memories, such as main memory 708 and secondary memory 710. Either of main memory 708 and secondary memory 710 can be memory semiconductors (e.g. DRAMs, etc.). These computer program products are means for providing software to computer system 700.

Computer programs (also called computer control logic) are stored in main memory 708 and/or secondary memory 710. Computer programs may also be received via network interface 724. Such computer programs, when executed, enable computer system 700 to implement the embodiments as discussed herein. In particular, the computer programs, when executed, enable processor 704 to implement the processes of embodiments of the present invention, such as the steps in the method discussed above. Accordingly, such computer programs represent controllers of the computer system 700. Where embodiments are implemented using software, the software may be stored in a computer program product and loaded into computer system 700 using removable storage drive 714, interface 720, or hard drive 712.

Embodiments may be directed to computer products comprising software stored on any computer usable medium. Such software, when executed in one or more data processing device, causes a data processing device(s) to operate as described herein.

Embodiments may be implemented in hardware, software, firmware, or a combination thereof. Embodiments may be implemented via a set of programs running in parallel on multiple machines.

CONCLUSION

The detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

Features and advantages of the invention are set forth in the description that follows, and in part are apparent from the description, or may be learned by practice of the invention. The advantages of the invention are realized and attained by the structure and particularly pointed out in the written description and claims hereof as well as the appended drawings. The detailed description is exemplary and explanatory and is intended to provide further explanation of the invention as claimed.

The embodiment(s) described and references in the specification to "one embodiment," "an embodiment," "an example embodiment," etc., indicate that the embodiment(s) described may include a particular feature, structure, or characteristic. However, every embodiment may not necessarily include the particular feature, structure or characteristic. Moreover, such phrases are not necessarily referring to the same embodiment. When a particular feature, structure or characteristic is described in connection with an embodiment, it is understood that it is within the knowledge of one skilled in the art to effect such feature, structure, or characteristic in connection with other embodiments, whether or not explicitly described.

It would be apparent to one of skill in the relevant art that the embodiments described can be implemented in many different embodiments of software, hardware, firmware, and/or the entities illustrated in the figures. Any actual software code with the specialized control of hardware to implement embodiments is not limiting of this description. Thus, the operational behavior of embodiments is described with the understanding that modifications and variations of the embodiments are possible, given the level of detail presented.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for determining one or more camera calibration parameters, comprising:
   determining, by one or more computing devices, a set of common features between a plurality of photographic images taken by a camera, the set of common features including at least a portion of a same object captured in each of the photographic images;
   receiving, by the one or more computing devices, acceleration data provided by an accelerometer coupled to the camera, wherein the acceleration data is received for each of the captured photographic images; and
   calculating, by the one or more computing devices, values for each of the one or more calibration parameters of the camera, based on at least the determined set of common features and the received acceleration data for each of the captured photographic images;
   wherein the determining includes determining the set of common features between photographic images of varying pitch or roll angle; and
   wherein the calculating includes calculating a value for at least one of a focal length, a lens distortion, and an optical center associated with the camera.

2. The method of claim 1, further comprising storing the values in a database.

3. The method of claim 1, wherein the determining includes determining the set of common features between a plurality of photographic images using an image descriptor method.

4. The method of claim 1, further comprising determining an error value associated with the calculated values for the one or more calibration parameters.

5. The method of claim 4, further comprising prompting a user of the camera to capture a new plurality of photographic images if the error value is above a given threshold.

6. The method of claim 1, wherein calculating includes calculating the values for the one or more calibration parameters via minimization of an error function.

7. The method of claim 6, wherein minimizing the error function includes minimizing a function of initial camera calibration parameters, the set of common features, and the acceleration data.

8. The method of claim 6, wherein minimizing the error function includes solving using a Levenberg-Marquardt minimization technique.

9. The method of claim 6, wherein minimizing the error function includes solving a nonlinear least squares optimization technique.

10. The method of claim 1, further comprising: accessing the calculated values for the one or more calibration parameters via a software program coupled with the camera.

11. A mobile device system comprising:
    a camera having one or more calibration parameters;
    an accelerometer; and
    a calibration parameter determiner, executed on one or more processors, and configured to:
    determine a set of common features between a plurality of photographic images taken by the camera, the set of common features including at least a portion of a same object captured in each of the photographic images,
    receive acceleration data provided by the accelerometer, wherein the acceleration data is received for each of the captured photographic images, and
    calculate values for each of the one or more calibration parameters, based on at least the determined set of common features and the received acceleration data for each of the captured photographic images;
    wherein determining by the one or more processors includes determining the set of common features between photographic images of varying pitch or roll angle; and
    wherein calculating by the one or more processors includes calculating a value for at least one of a focal length, a lens distortion, and an optical center associated with the camera.

12. The system of claim 11, wherein the set of common features are determined using an image descriptor method.

13. The system of claim 11, wherein the calibration parameter determiner is further configured to determine an error value associated with the calculated values for the one or more calibration parameters.

14. The system of claim 13, wherein the calculated values for the one or more calibration parameters are stored in a database if the error value is below a given threshold.

15. The system of claim 11, further comprising a transmitter configured to transmit the calculated values for the one or more calibration parameters to a networked computer.

16. The system of claim 15, wherein the transmitter is further configured to transmit the determined set of common features and the acceleration data to the networked computer.

17. The system of claim 11, wherein the calculated values for the one or more calibration parameters are provided to a software program on the mobile device system.

18. A networked computer system comprising:
    a communication interface configured to:
    receive a set of common features between a plurality of photographic images taken by a camera, the set of common features including at least a portion of a same object captured in each of the photographic images, and receive acceleration data provided by an accelerometer coupled to the camera; and
    one or more processors configured to:
    determine the set of common features between photographic images of varying pitch or roll angle; and
    calculate values for each of the one or more calibration parameters, based on at least the set of common features and the acceleration data, the calculating including calculating a value for at least one of a focal length, a lens distortion, and an optical center associated with the camera.

19. The system of claim 18, further comprising a database configured to store the calculated values for the one or more calibration parameters.

20. The system of claim 18, wherein the communication interface is further configured to transmit the calculated values for the one or more calibration parameters to a mobile device associated with the camera.

* * * * *